March 15, 1966    A. DOWLEY ETAL    3,239,964
MACHINES FOR FINISHING ARTICLES OF CERAMIC WARE
Filed July 18, 1963    4 Sheets-Sheet 1

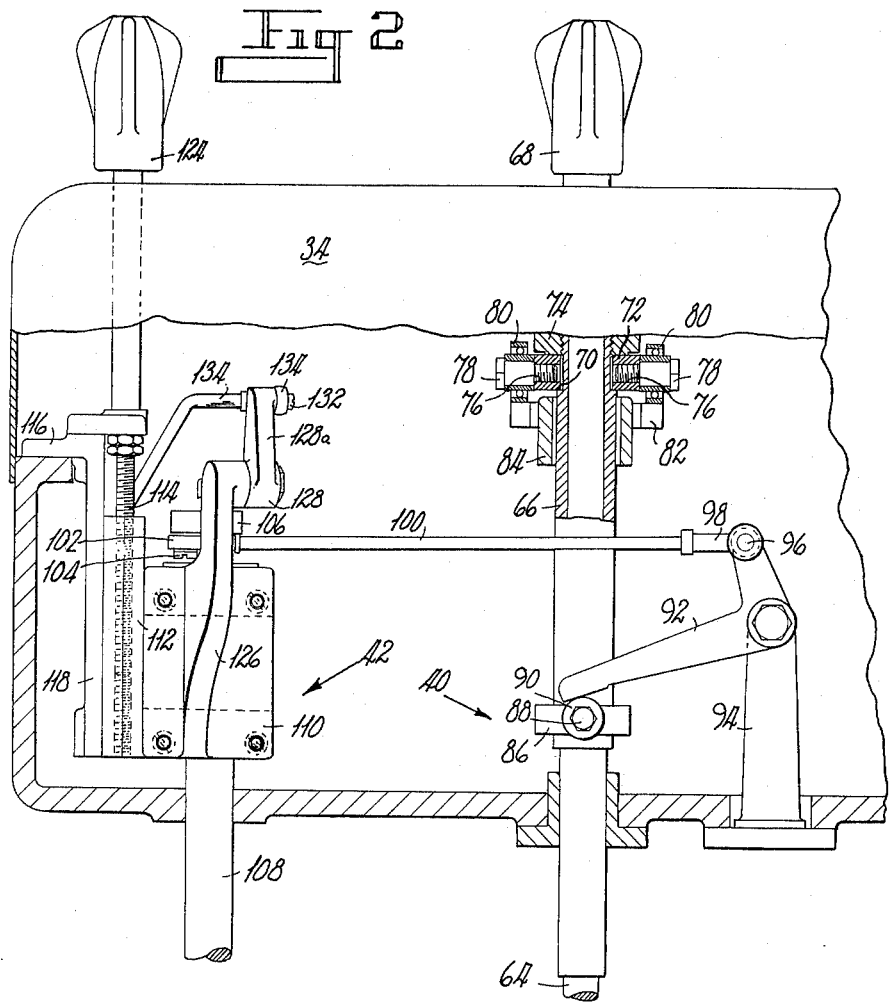

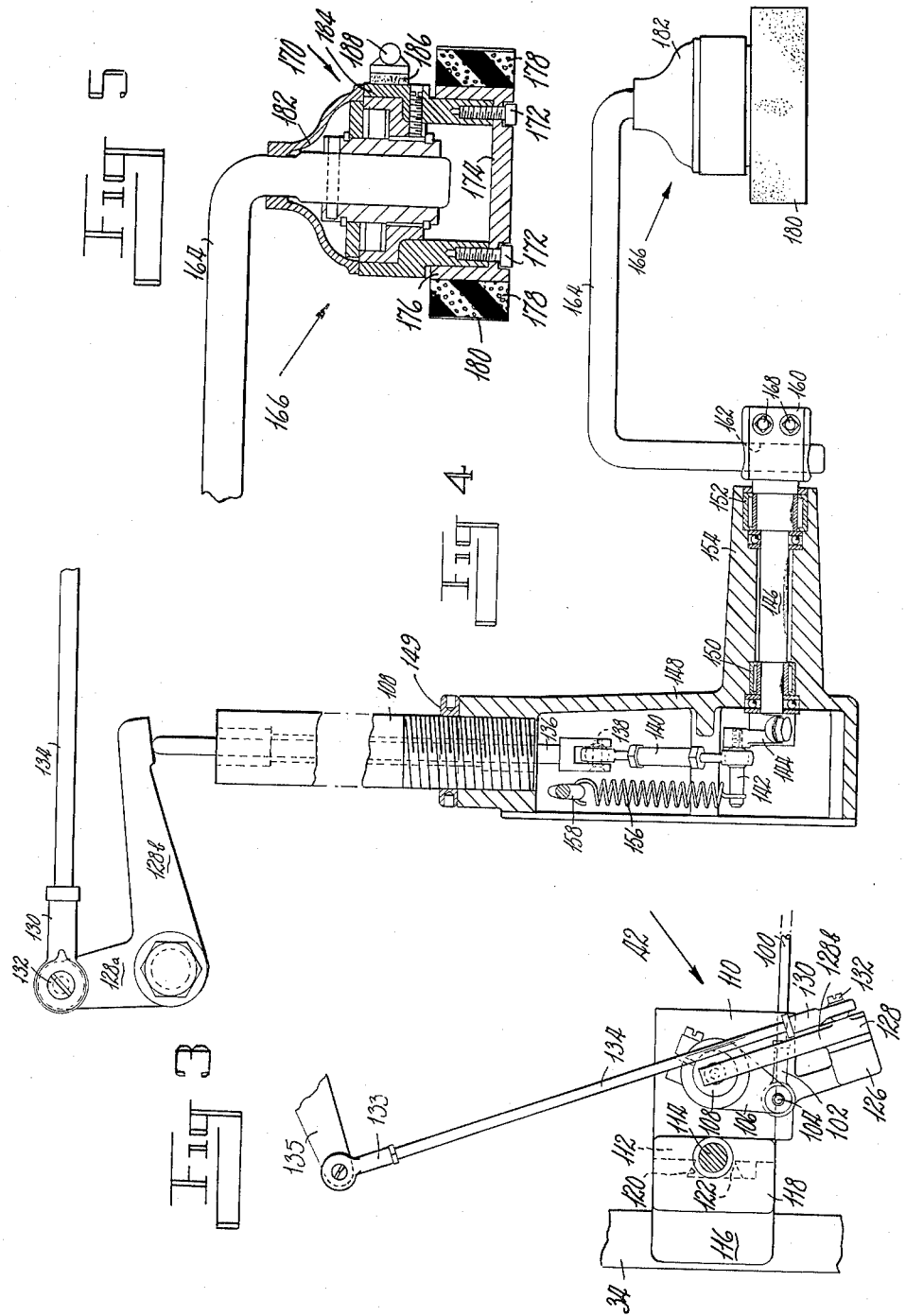

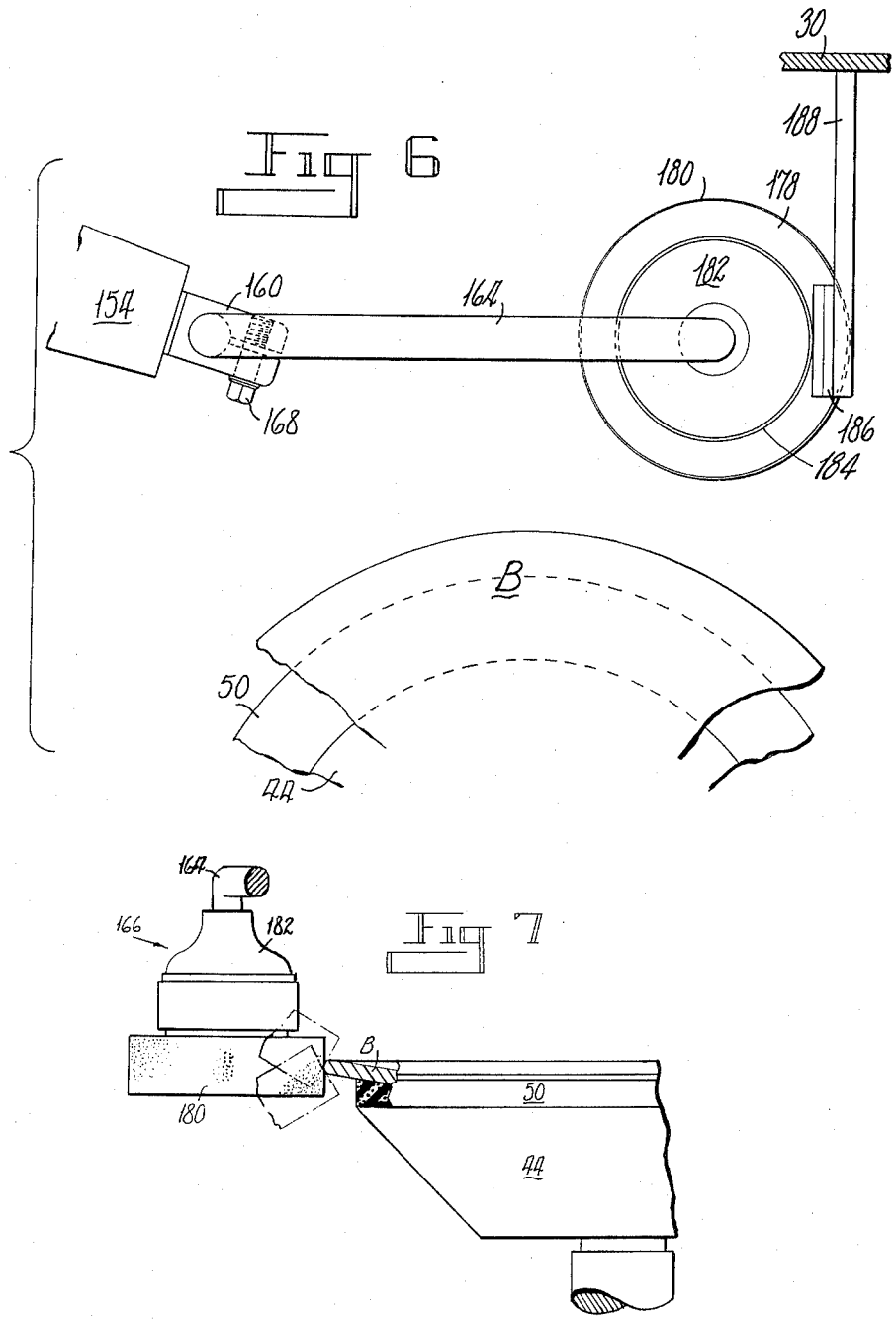

3,239,964
MACHINES FOR FINISHING ARTICLES OF
CERAMIC WARE
Arthur Dowley and Harold Roberts, Stoke-on-Trent, England, assignors to Service (Engineers) Limited, Stoke-on-Trent, England, a British company
Filed July 18, 1963, Ser. No. 296,054
Claims priority, application Great Britain, July 27, 1962, 28,876/62
7 Claims. (Cl. 51—58)

This invention is concerned with machines for finishing articles of ceramic ware, more especially with machines for performing surface-finishing operations on circular workpieces in the manufacture of articles of ceramic ware.

In the manufacture of articles of ceramic ware from clay, it is a customary procedure to form blanks (constituting workpieces) from moist clay and to subject them to a partial drying operation in an oven, then to perform surface-finishing operations upon them and subsequently to fire them. Where the blanks are circular, e.g. blanks for plates or saucers, the surface-finishing operations usually comprise mounting the blanks in turn on a rotatable work support and, while the latter is rotating about a vertical axis, operating on the edge portion of each blank with an edge fettling tool consisting of a piece of spring steel with a V-shaped notch in it and on the upper surface of each blank with a piece of towing material, which is normally emery cloth, felt or tow. It is often the case that these operations are performed by hand, the operator controlling the speed of rotation of the work support by a foot treadle and holding the fettling tool and towing material in his hands.

Machines comprising towing and fettling devices for performing, or assisting in performing, face towing and edge fettling operations have been proposed. A machine for towing circular articles or pottery ware has been proposed, for example, comprising a turret carrying four rotatable annular work supports in succession to a first station where arms of a centering mechanism operate twice on the ware to centralise it on the work support, whereafter the ware is carried by the turret to a second station at which the upper surface of the ware is operated upon by a face towing tool. A face towing tool has been described, together with its mode of operation, in the specification of United States patent application Serial No. 171,477, now Patent No. 3,146,552, granted September 1, 1964.

It is one of the various objects of the present invention to provide an improved edge fettling device for performing a fettling operation on the edge portions of workpieces in the manufacture of articles of ceramic ware.

It is another of the various objects of the present invention to provide a machine for use in the manufacture of articles of ceramic ware which enables surface-finishing operations to be carried out on circular, or substantially circular, workpieces in an improved manner.

There is hereinafter described in detail, to illustrate the invention by way of example, a machine for performing face towing and edge fettling operations on flat-ware blanks in the manufacture of pottery, which machine comprises a turret carrying four rotatable work supports in succession to a station at which surface-finishing operations are carried out on successive blanks supported on the work supports, each work support comprising an annular rim provided by a flexible rubbery strip against which the marginal portion of the under-side of a blank can be gripped, conveniently by suction means. The machine comprises, at said station, a face towing device which presents to a dished surface of a rotating blank a strip of, or a series of pieces of, flexible polyurethane foam material in which finely divided grains of abrasive have been embedded, as described in the specification of United States patent application Serial No. 171,477, now Patent No. 3,146,552, granted September 1, 1964, and an edge feetling device comprising an abrasive element in the form of a tool having an annular abrasive work-engaging surface which is presented to the edge portion of the blank and rocked, as the blank rotates, over and under about the said edge portion of the blank.

The term "flat-ware" where used herein is used in relation to a blank for an article of ceramic ware in the sense customary in the pottery industry, viz. to indicate a blank for a plate or saucer as opposed to one for a cup or bowl which is regarded as hollow-ware.

The edge fettling device comprises a shaft providing a support at one end portion thereof for a cranked arm on which the edge fettling tool is mounted, the edge fettling tool comprising a wheel having an abrasive work-engaging material bonded to the periphery thereof and being arranged, once in each cycle of operation of the machine, to be indexed through a small distance whereby a new portion of the work-engaging surface of the tool is presented to each successive blank in the operation of the machine. The edge fettling tool also comprises a one-way clutch arrangement arranged to hold the wheel against rotation about its axis when urged in one direction by engagement of the work therewith in the operation of the machine, and to allow rotation of the wheel in the opposite direction whereby the work-engaging surface is indexed through a small distance as aforesaid. The shaft which provides support for the cranked arm, and thus for the wheel, is mounted for swinging movement about a vertical, or substantially vertical, axis, whereby to move the tool into and out of engagement with the work, and for limited rotation about its longitudinal axis, said axis passing through, and lying tangentially, or substantially tangentially, to, the work-engaging surface of the tool at the operating locality thereof, and being arranged, when the fettling tool is in engagement with the blank, to lie in a position tangentially, or substantially tangentially, to, and in the same plane as, the edge portion of the blank (i.e. in a horizontal plane). Cam means is provided in the machine for swinging and rocking the shaft of the fettling device respectively about the aforementioned axes.

In the operation of the machine, a flat-ware blank in the white state (i.e. partially dried to about 3% water content on a wet weight basis) is placed on one of the work supports of the machine and is centered thereon after the work support has been brought to a first station of the machine on rotation of the turret. The blank is then gripped on the work support by the suction means, the ware resting on the annular rim of the work support. At the next station to which the work support is brought on rotation of the turret, the suction being maintained at this station, the work support is caused to rotate at 450 revolutions per minute and the face towing and edge fettling devices are simultaneously caused to engage the blank, the edge fettling tool being caused to rock from an initial, central, position, in which the work-engaging surface thereof is in a vertical, or substantially vertical, position, through 30° towards the upper surface of the blank, back through 60° around the edge portion of the blank towards the under-side thereof, and back again to its initial position. It has been found that engagement of each of the flat-wire blanks by the face towing and edge fettling devices for three to four seconds is usually sufficient to give the blanks a uniformly smooth condition over their upper surfaces and around their edge portions without unduly rubbing away any embossed portions that may form a desirable part of their design and without any apparent evidence of circular lines having been scored on the surface or of any prominent boundary between the areas of engagement by the separate devices.

There now follows a detailed description, to be read with reference to the accompanying drawings, of the machine. It is, however, to be understood that the machine and its method of operation as hereinafter described have been selected for description merely by way of exemplification of the invention and not by way of limitation thereof.

In the accompanying drawings:

FIGURE 2 is a front view, partly in section and with parts broken away, showing, on an enlarged scale, a head portion of the machine shown in FIGURE 1;

FIGURE 3 is a plan view of part of the head portion of the machine shown in FIGURE 2 showing a portion of a fettling device of the machine;

FIGURE 4 is a view, partly in section and with parts broken away, of the fettling device, including a fettling tool and means for supporting it, of the machine;

FIGURE 5 is a sectional view of the fettling tool of the machine;

FIGURE 6 is a plan view showing the relative positions of the fettling tool of the machine and the work piece; and FIGURE 7 is a fragmentary side view, partly in section, illustrating the extent of rocking movement of the fettling tool of the machine.

Figure 1:
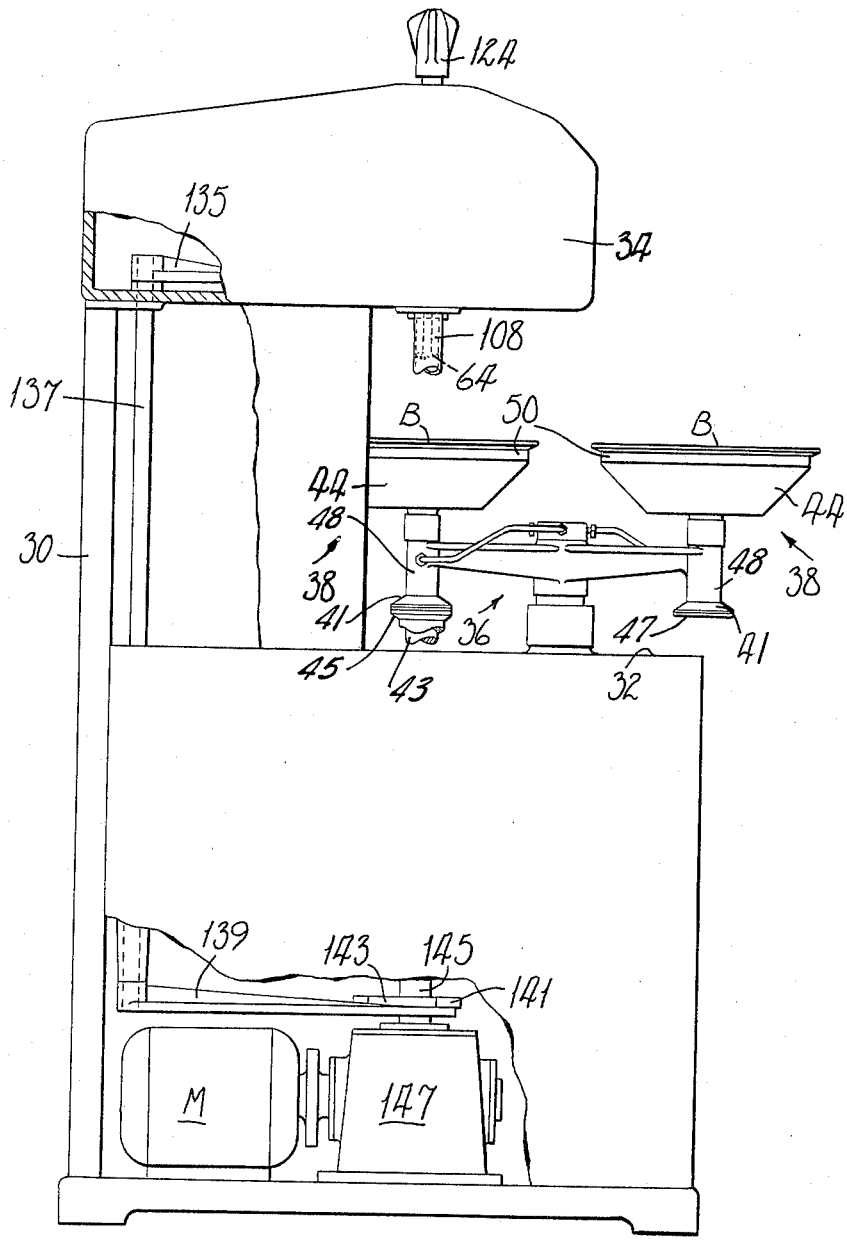
FIGURE 1 is a left hand side elevation, with parts broken away, of a machine suitable for use in towing and fettling flat-ware blanks.
Figure 1:
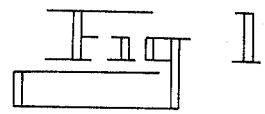

Referring to FIGURE 1, the machine comprises a main frame 30 having a flat table 32 and a head portion 34 that overhangs the table 32. Mounted for rotation above the table 32 about a vertical, or substantially vertical, axis is a turret 36 on which are mounted four work supports 38 (two only shown in FIGURE 1). At a second station of the machine are mounted, in the head portion 34 thereof and extending downwardly therefrom, a face towing device generally designated 40 (FIG. 2) and an edge fettling device generally designated 42, the face towing device comprising a towing tool (not shown) arranged to engage the face of a flat-ware blank (supported on a work support at the second station of the machine) over little more than the length of a radius thereof, and the edge fettling device being arranged to engage an edge portion of the blank diametrically opposite the portion which the towing device overhangs at the same time as, and for substantially the same duration as, the face towing device engages the surface of the blank, the face towing device of the machine being constructed and arranged to operate in the manner described in the specification of United States patent application Serial No. 171,477, now Patent No. 3,146,552, granted September 1, 1964. Each work support 38 of the machine comprises a circular cast aluminum base 44, that is received on an upwardly projecting portion of a tubular spindle 48 forming part of the machine, and has an annular rim provided by a rubbery strip 50 of flexible cellular material (FIGURE 7) against which, in the operation of the machine, the marginal portion of the under-side of a blank is gripped, conveniently by suction means (not shown).

Fixed to the lower end of the spindle 48 is a frusto conical-shaped member 41 having on its surface a coating or sheathing 47 having a high coefficient of friction. In the finishing station of the machine there is disposed beneath the spindle 48, as viewed in FIG. 1, a rotatable shaft 43 in axial alignment with the spindle 48. Fixed to the upper end of the shaft 43 is another frusto conically-shaped member 45 having an upper face having a high friction surface and being substantially equal in area to the under faces of the members 41. The shaft 43 is movable axially to engage and disengage the member 45 with the members 41. The shaft 43 receives rotation from a shaft (not shown) which is driven by an electric motor M through a reduction gear box (not shown). When the members 45 and 41 are engaged, rotation of the shaft 43 causes rotation of the spindle 48 and therefore the work support 38. The members 41 and 45 may be provided with interlocking teeth or any other such arrangement, rather than high friction surfaces, for the transmission of rotational movement.

The turret 36 of the machine is rotated step-by-step in the operation thereof to bring successive work supports to a first station at which, prior to suction being applied as aforesaid, work-centering means (not shown) are effective accurately to position a blank centrally on its work support and subsequently, after suction has been applied to the workpiece thus positioned, to the second station at which surface-finishing operations are performed.

Supported in the head portion 34 of the machine, at the second station thereof, is a shaft 64 (FIGURE 2) extending heightwise of the machine, the machine being so arranged that the axis of the tubular spindle 48 of each successive work support 38, as it is brought to the second station, lies parallel, or substantially parallel, to the axis of the shaft 64. The shaft 64, which forms part of the face towing device 40 of the machine, supports a sleeve 66 and carries, at its lower end portion, a face towing tool (not shown) constructed and arranged to operate substantially as described in the specification of United States application Serial No. 171,477, now Patent No. 3,146,552, granted September 1, 1964, means being provided, including an adjusting screw, a head portion 68 of which is shown in FIGURE 2, for effecting relative movement between the shaft 64 and the sleeve 66 whereby to vary the heightwise position of the towing tool for various sizes and thicknesses of ware. The sleeve 66, at an intermediate portion thereof, is of enlarged diameter, a shoulder 70 being thus formed between the intermediate portion and an upper end portion of the sleeve. Adjacent the shoulder 70 the upper end portion of the sleeve is threaded to receive a threaded collar 72 secured in position against the shoulder 70 by a lock-nut 74. The collar 72 is provided with two diametrically opposed tapped bores 76 each of which receives a bolt 78 arranged to support, for rotation about a central portion thereof, a roll 80, there being thus two rolls 80 arranged one at either side of the collar 72. The rolls 80 rest on a bifurcated end portion of an arm 82 mounted on a shaft (not shown) extending transversely of the machine and arranged to rotate under the influence of a cam member (not shown), in the operation of the machine, whereby to effect a raising and lowering of the bifurcated end portion of the arm 82, there being provided a bush 84, forming part of a cross support member (not shown), through which the sleeve 66 can pass and which serves as a guide member for the bifurcated end portion of the arm 82. Lowering of the end portion of the arm 82 is thus effective to allow the shaft 64 and the sleeve 66 to fall, under their own weight, whereby the towing tool (not shown) is brought into engagement with the upper surface of the blank supported, for face towing and edge fettling operations to be performed, on a work support 38 at the second station of the machine. Similarly, raising of the said end portion is effective to lift the towing tool out of engagement with the blank, when the operation thereon has been completed.

Towards the lower end of the intermediate portion of the sleeve 66 is mounted a collar 86 tapped to receive a bolt 88 which supports a roll 90 for heightwise movement with the sleeve 66. The roll 90 is arranged to be engaged by an end portion of one arm of a bell crank lever 92 mounted for pivotal movement on a post 94 secured on the base of the head portion 34 of the machine. At an end portion of the other arm of the bell crank lever 92 is mounted, for pivotal movement about a pin 96, a sleeve portion 98 accommodating one end portion of a rod 100 (FIGURES 2 and 3) which extends transversely of the machine. The other end portion of the rod 100 is accommodated also in a sleeve portion 102 pivotally mounted on a pin 104 which, in turn, is supported by an eccentric member 106 mounted at an upper end portion of a shaft 108 extending heightwise of the machine, movement of the rod 100, under the influence of the bell crank lever 92, transversely of the machine being thus effective to cause the shaft 108 to rotate about its axis.

The shaft 108, which forms part of the edge fettling device 42 of the machine now to be described, is supported in a block 110 integral with which is a member 112 tapped to accommodate a threaded end portion of a shaft 114 supported by a bracket 116 in the head portion 34 of the machine. The bracket 116 has a downwardly extending portion 118 which is arranged to serve as a guide member for the member 112, the said portion 118 having formed, in the surface thereof that engages the member 112, a slot 120 which accommodates a dovetail portion 122 of the member 112. At the upper end of the shaft 114 is secured a head portion 124, similar to the aforementioned head portion 68, rotation of the shaft 114 being effective to vary the heightwise position of the member 112 and thus the block 110 integral therewith.

The block 110 is also provided with an integral arm 126 arranged to support, at an upper end portion thereof, a bell crank lever 128 for movement about a pivot, there being mounted on one arm 128a of the bell crank lever, at the end portion thereof remote from the pivot, a sleeve portion 130 pivotally secured to the arm by means of a threaded pivot pin 132. The sleeve portion 130 receives an end portion of a cranked rod 134 which extends generally forwardly and rearwardly of the machine, the other end portion of the rod 134 being received in another sleeve portion 133 pivotally mounted on one end portion of an arm 135, the arm 135 being fixedly secured at the upper end portion of a vertical rod 137 (FIGURE 1). Fixedly secured at the lower end portion of the rod 137 is an arm 139 at the end portion remote from the rod 137 of which is mounted a cam follower 141, the cam follower being arranged to engage a cam member 143 mounted on a main cam shaft 145 of the machine, rotation of the cam shaft, which is driven by the electric motor M through a reduction gear box 147, being thus effective to cause the bell crank lever 128 to rock about its pivot.

The other arm 128b of the bell crank lever 128 extends over, and abuts against, an upper end portion of a rod 136 (FIGURE 4) which is accommodated in a bore of the shaft 108, said bore extending throughout the length of the shaft and the rod 136 being capable of sliding movement relative to the shaft in the operation of the machine. At the lower end portion of the rod 136 is a bifurcated portion which receives, for pivotal movement about a pin 138 secured therein, one end portion of a link 140 capable of lengthwise adjustment, the other end portion of the link being pivotally secured by means of a pin 142 to an eccentric member 144 mounted on a horizontal, or substantially horizontal, shaft 146, the longitudinal axis of which is thus arranged to lie normal, or substantially normal, to the axis of the shaft 108 of the edge fettling device. A housing 148 screwed on to the lower end portion of the shaft 108 and secured thereon by means of a locknut 149 is provided for the link 140 and eccentric member 144 and serves as a support for the shaft 146, bearings 150, 152 being arranged in a sleeve portion 154 integral with the housing 148 for this latter purpose. A tension spring 156 acts between a hook 158 secured in the housing 148 and the pin 142 whereby constantly to urge the link 140 and thus the rod 136 upwardly and in this way to maintain the rod 136 in engagement with the arm 128b of the bell crank lever. As the bell crank lever 128 is caused to rock about its pivot as aforesaid, the arm 128b effects heightwise movement of the rod 136, under or against the influence of the spring 156, as the case may be, relative to the shaft 108 which movement is effective, through the link 140 and eccentric member 144, to cause the shaft 146 to rotate about its axis.

At the end portion of the shaft 146 remote from the eccentric portion 144 is a portion 160 of enlarged diameter provided, transversely of its axis, with a bore 162 which receives an end portion of a cranked arm 164, on the other end portion of which is secured an edge fettling tool generally designated 166, the cranked arm 164 being so arranged in relation to the shaft 146 that the axis of the shaft 146 passes through the work-engaging surface of the fettling tool 166. The portion 160 of enlarged diameter is split at its open end portion whereby to facilitate insertion and withdrawal of the cranked arm 164, two screws 168 being provided for securing the cranked arm 164 in a desired position prior to the operation of the machine The edge fettling tool 166, which is arranged, by heightwise adjustment of the member 112 relative to the portion 118 of the bracket 116, to lie in the same horizontal plane as the edge portion of a blank to be operated upon supported on a work support 38 at the second station of the machine, comprises a one-way clutch arrangement generally designated 170 (FIGURE 5) to which is detachably secured, by means of screws 172, a flanged wheel 174. About the flange 176 of the wheel 174 is bonded a strip of sponge rubber 178 on the surface of which, in turn, is bonded a strip of emery cloth 180 providing an abrasive work-engaging surface of the fettling tool 166. The upper portion of the one-way clutch arrangement 170 is provided with a rubber seal 182 to prevent the operation of the clutch arrangement from being impaired by dust in the operation of the machine. The one-way clutch arrangement 170 is so constructed and arranged that when the work-engaging surface of the edge fettling tool 166 engages the edge portion of a blank B supported on a work support 38, which work support is rotating in a clockwise direction (viewing FIGURE 6), the flanged wheel 174 is held against anticlockwise (viewing FIGURE 6) rotation, in which direction it is urged by engagement with the blank as aforesaid, whereby to present to said edge a non-rotating abrasive surface.

The edge fettling device 42 of the machine is arranged to engage a blank B supported on a work support 38, in the operation of the machine, substantially at the same time as, and substantially for the same duration as the face towing device 40. Thus downward movement of the face towing device is effective, through the bell crank lever 92, rod 100 and eccentric member 106, to rotate the shaft 108 about its axis whereby to move the edge fettling tool 166 supported on the cranked arm 164 from an inoperative position (as shown in FIGURE 6) to an operative, work-engaging position in which an edge fettling operation is carried out. As the face towing device 40 is raised, at the end of a cycle of operation of the machine, the edge fettling tool 166 is swung away out of engagement with the blank. As the edge fetting tool is thus swung, an outer, rotatable portion 184 (FIGURES 5 and 6) of the clutch arrangement 170 is caused to engage an abutment in the form of a pad 186, arranged on an arm 188 secured to the main frame 30 of the machine, in such a manner as to cause the said portion 184, and thus also the flanged wheel 174 together therewith, to be rotated in a clockwise (viewing FIGURE 6) direction. In this way the edge fettling tool 166 is indexed about ⅛ of an inch whereby to present a new portion of the work-engaging surface thereof to each successive blank brought to the second station of the machine in the operation thereof.

While the edge fettling tool 166 is in engagement with a blank, in the operation of the machine, it is also caused to be rocked about the axis of the shaft 146, through the link 140 and eccentric member 144, the axis of the shaft 146, as stated above, being so arranged as to pass through, and lie tangentially, or substantially tangentially, to, the work-engaging surface of the fettling tool 166 at the operating locality thereof; the rod 134, under the influence of the cam member 143, is moved forwardly and rearwardly for effecting rocking of the tool, such forward and rearward movement being effective through the bell crank lever 128 to cause the lowering and raising of the rod 136, against and under the influence of the spring 156 respectively. The edge fettling device is so constructed and arranged as to give a rocking amplitude of 60° to the edge fettling tool 166; thus the tool is rocked forwardly 30° over the edge of the blank being operated upon and back through 60° around the edge of the blank to be rocked 30° under the edge of the blank also. In operating on a blank, there is usually a hard flash to be removed from the extreme edge of the work; the cam member 143, therefore, that effects the rocking movement of the fettling tool is also effective, as the fettling tool is rocked over and under about the edge portion of the blank, to cause the fettling tool to dwell at an intermediate position, viz. as it traverses the extreme edge of the blank.

The machine is conveniently provided with a hood (not shown) leading to a dust extractor (also not shown) and arranged to withdraw dust from the operating localities of the face towing and edge fettling devices.

In the operation of the machine, the operator first adjusts the heightwise position of both the face towing device 40 and the edge fettling device 42 thereof. A blank B is then placed on a work support 38 at the loading station of the machine and a cycle of operation thereof initiated, the blank being thus carried to the first station of the machine at which the blank is accurately centered on the work support, suction then being applied whereby the blank is gripped on the work support. When the next cycle of operation is initiated, the blank is brought to the second station of the machine at which the surface-finishing operations are to be carried out. With the suction still being applied, the work support 38 is caused to rotate at 450 revolutions per minute; the face towing tool and the edge fettling tool are then brought into engagement with the upper surface and the edge portion of the blank respectively, substantially at the same time, the fettling tool being caused to rock about the axis of the shaft 146 30° over the edge portion and 30° under the edge portion of the blank, at a rate of one complete reciprocation per second. It has been found that an operating time of 3 to 4 seconds is usually sufficient to render the upper surface of the blank smooth and free from scoring and the edge smoothly rounded. On initiation of the next cycle of operation of the machine, the blank is carried to the unloading station thereof at which the suction ceases to be applied, rotation of the work support having previously been stopped, and the blank can then be removed. The next cycle of operation brings the work support back to the loading station of the machine. It is to be understood that under normal working conditions blanks are loaded on successive work supports as they are brought to the loading station and, during each cycle of operation of the machine, centering and surface-finishing operations, loading and unloading are taking place simultaneously on different blanks supported on work supports at the respective stations of the machine.

Having thus described our invention, what we claim as new and desire to secure by Letters Patent of the United States is:

1. In a machine for performing surface-finishing operations on circular workpieces in the manufacture of articles of ceramic ware, a rotatable work support, means for causing the work support to be rotated, an edge fettling tool having a work-engaging surface arranged to engage the edge portion of a workpiece supported on the work support, means for causing the edge fettling tool to be rocked about an axis whereby the work-engaging surface thereof is caused to be rocked about the edge portion of the workpiece, and means whereby, at periodic intervals in the operation of the machine, the edge fettling tool is indexed through a small distance.

2. In a machine for performing surface-finishing operations on circular work pieces in the manufacture of articles of ceramic ware and having a rotatable work support and means for causing the work support to be rotated, an edge fettling tool comprising a wheel having an abrasive work-engaging surface, means for moving the wheel toward and away from the work support whereby to bring the work-engaging surface into and out of engagement with a work piece, means for causing the wheel to be rocked about an axis whereby the work-engaging surface is caused to be rocked about the edge of the work piece, and means for partially rotating the wheel about its axis as the wheel is moved away from the work support, whereby a new portion of the work-engaging surface of the wheel is presented to each successive work piece.

3. In a machine for performing surface-finishing operations on circular work pieces in the manufacture of articles of ceramic ware and having a rotatable work support and means for causing the work support to be rotated, an edge fettling tool comprising a wheel having an abrasive work-engaging surface, means for moving the wheel toward and away from the work support whereby to bring the work-engaging surface into and out of engagement with a work piece, means for causing the wheel to be rocked about an axis whereby the work-engaging surface is caused to be rocked about the edge of the work piece, and means for causing the wheel in its rocking motion to dwell at an intermediate position.

4. In a machine for performing surface-finishing operations on circular workpieces in the manufacture of articles of ceramic ware, a rotatable work support, means for causing the work support to be rotated, an edge fettling tool comprising a wheel having an abrasive work-engaging surface and being movable bodily towards and away from the work support whereby to bring the work-engaging surface into and out of engagement, in the operation of the machine, with the edge portion of a workpiece supported on the work support, means for effecting bodily movement of the wheel towards and away from the work support, means for causing the wheel to be rocked about an axis passing through, and lying substantially tangentially to, the work-engaging surface of the wheel at the operating locality thereof, whereby the work-engaging surface is caused to be rocked over and under about the edge portion of the workpiece, and means including an abutment whereby, once in each cycle of operation of the machine, as the wheel is moved bodily away from the work support, it is caused to rotate about its axis of rotation through a small distance by engagement with the abutment whereby a new portion of the work-engaging surface of the wheel is presented to each successive workpiece in the operation of the machine.

5. In a machine for performing surface-finishing operations on circular workpieces in the manufacture of articles of ceramic ware, a rotatable work support, means for causing the work support to be rotated, an edge fettling tool comprising a wheel having an abrasive work-engaging surface and being movable bodily towards and away from the work support whereby to bring the work-engaging surface into and out of engagement, in the operation of the machine, with the edge portion of a workpiece supported on the work support, means for effecting bodily movement of the wheel towards and away from the work support, means for causing the wheel to be rocked about an axis passing through, and lying substantially tangentially to, the work-engaging surface of the wheel at the operating locality thereof, whereby the work-engaging surface is caused to be rocked through an amplitude of about 60° about the edge portion of the workpiece, and means including an abutment whereby, once in each cycle of operation of the machine, as the wheel is moved bodily away from the work support, it is caused to rotate about its axis of rotation through a small distance by engagement with the abutment whereby a new portion of the work-engaging surface of the wheel is presented to each successive workpiece in the operation of the machine, the arrangement being such that the work-engaging surface of the wheel is caused to be rocked from a central position forwardly through about 30° over the edge portion of the workpiece and backwardly through the central position and through about 30° under the said edge portion, in the operation of the machine, and is caused to dwell at an intermediate position as it is being caused to be rocked as aforesaid.

6. In a machine for performing surface-finishing operations on circular workpieces in the manufacture of articles of ceramic ware, a rotatable work support, means for causing the work support to be rotated, an edge fettling tool comprising a wheel having, about its periphery, an annular abrasive work-engaging surface and being movable bodily towards and away from the work support whereby to bring a portion of the work-engaging surface into and out of engagement with the edge portion of a workpiece supported on the work support, means for effecting bodily movement of the wheel towards and away from the work support, means for causing the wheel to be rocked about an axis passing through, and lying substantially tangentially to, the work-engaging surface of the wheel at the operating locality thereof, said axis being arranged, when the work-engaging surface of the wheel is in engagement with the workpiece, to be substantially tangential to, and in the same plane as, the edge portion of the workpiece, whereby the work-engaging surface is caused to be rocked over and under about the edge portion of the workpiece, and means including an abutment whereby, once in each cycle of operation of the machine, as the wheel is moved bodily away from the work support, it is caused to rotate about its axis of rotation through a small distance by engagement with the abutment, whereby a new portion of the work-engaging surface of the wheel is presented to each successive workpiece in the operation of the machine.

7. A machine for performing surface-finishing operations on circular workpieces in the manufacture of articles of ceramic ware comprising (i) a frame, (ii) a work support mounted for rotation on the frame, (iii) means for causing the work support to be rotated, (iv) an edge fettling device comprising an edge fettling tool in the form of a wheel having, about its periphery, an annular abrasive work-engaging surface, a one-way clutch arrangement for restraining rotation of the wheel in one direction, whereby to present a stationary work-engaging surface to a workpiece supported on the work support, and for allowing rotation of the wheel in the opposite direction, and a shaft supported for limited rotation about its longitudinal axis and providing a support for the wheel and the one-way clutch arrangement of the edge fettling device, the longitudinal axis of the shaft passing through, and lying substantially tangentially to, the annular work-engaging surface of the wheel at the operating locality thereof, (v) cam-operated means for causing the shaft to be swung about an axis lying normal, or substantially normal, to the longitudinal axis thereof whereby to move the wheel towards and away from the work support and thus to bring a portion of the annular abrasive work-engaging surface of the wheel into and out of engagement with the edge portion of a workpiece supported on the work support, (vi) cam-operated means for effecting limited rotation of the shaft, when a portion of the work-engaging surface of the wheel is brought into engagement with the edge portion of the workpiece as aforesaid, whereby to cause the portion of the work-engaging surface of the wheel to be rocked over and under about the edge portion of the workpiece, and (vii) means including an abutment secured to the frame whereby, once in each cycle of operation of the machine, as the wheel is moved bodily away from the work support, it is caused to rotate about its axis of rotation through a small distance by engagement with the abutment whereby a new portion of the work-engaging surface of the wheel is presented to each successive workpiece in the operation of the machine.

References Cited by the Examiner

UNITED STATES PATENTS

| | | | |
|---|---|---|---|
| 2,139,896 | 12/1938 | Johnson | 51—67 |
| 2,597,616 | 5/1952 | Bruce | 125—11 |
| 2,741,076 | 4/1956 | Jordan | 51—161 |
| 2,849,820 | 9/1958 | Reschke | 51—58 X |
| 2,966,010 | 12/1960 | Guignard | 51—33.1 |
| 3,142,942 | 8/1964 | Celovsky | 51—216.5 X |
| 3,146,552 | 9/1964 | Croshaw et al. | 51—62 |

ROBERT C. RIORDON, *Primary Examiner.*

LESTER M. SWINGLE, *Examiner.*